(12) United States Patent
Cummins et al.

(10) Patent No.: US 7,209,156 B2
(45) Date of Patent: Apr. 24, 2007

(54) CD RECORDER AND PRINTER

(75) Inventors: Robert P. Cummins, Deephaven, MN (US); Erick Hagstrom, Medina, MN (US); Michael R. Tolrud, Chaska, MN (US)

(73) Assignee: Primera Technology, Inc., Plymouth, MN (US)

( * ) Notice: Subject to any disclaimer, the term of this patent is extended or adjusted under 35 U.S.C. 154(b) by 279 days.

(21) Appl. No.: 10/960,199

(22) Filed: Oct. 7, 2004

(65) Prior Publication Data

US 2005/0069344 A1   Mar. 31, 2005

Related U.S. Application Data

(63) Continuation of application No. 10/447,503, filed on May 29, 2003, now Pat. No. 7,061,515, which is a continuation-in-part of application No. 10/162,363, filed on Jun. 3, 2002, now Pat. No. 6,760,052.

(51) Int. Cl.
*B41J 2/315* (2006.01)
(52) U.S. Cl. .................................................... 347/171
(58) Field of Classification Search ................ 347/171, 347/193, 197, 222; 400/48, 54, 58, 61, 120.01, 400/120.07, 120.16, 208, 682; 101/4, 35–37, 101/44
See application file for complete search history.

(56) References Cited

U.S. PATENT DOCUMENTS

| 5,518,325 A | 5/1996 | Kahle ............................ 400/70 |
| 5,542,768 A | 8/1996 | Rother et al. .......... 400/120.16 |
| 5,549,444 A | 8/1996 | Dubuit ..................... 414/796.7 |
| 5,734,629 A | 3/1998 | Lee et al. ................. 369/30.34 |
| 5,873,692 A | 2/1999 | Costas ..................... 414/796.9 |
| 5,927,208 A | 7/1999 | Hagstrom et al. .......... 101/486 |
| 5,934,865 A | 8/1999 | Meadows ................. 414/796.9 |
| 5,946,216 A | 8/1999 | Hollerich ..................... 700/223 |
| 6,021,029 A | 2/2000 | Mamiya et al. ............. 360/133 |
| 6,111,847 A | 8/2000 | Assadian ................. 369/30.55 |
| 6,141,298 A | 10/2000 | Miller ...................... 369/30.33 |
| 6,148,722 A | 11/2000 | Hagstrom ..................... 101/35 |
| 6,222,800 B1 | 4/2001 | Miller et al. ............. 369/30.19 |
| 6,270,176 B1 | 8/2001 | Kahle ............................ 347/2 |

(Continued)

FOREIGN PATENT DOCUMENTS

DE   100 10 521 A1   11/2000

(Continued)

*Primary Examiner*—K. Feggins
(74) *Attorney, Agent, or Firm*—Westman, Champlin & Kelly, P.A.

(57) ABSTRACT

A disc copying or recording device and a disc label printer are mounted in a common assembly, and include a printhead moveable along a guide shaft on a frame. A disc transport carriage is mounted on the same guide shaft as the printhead, can be moved along this guide shaft for picking up discs in a storage area, moving a disc to a tray or support used for recording and then to a disc tray or support for printing, and moving a finished disc to a finished disc storage region. The carriage has an arm with a disc picker that can be moved to hold and release discs in a desired location. The carriage is latched to the printhead and the printhead drive is used for moving the carriage along the guide shaft in the preferred showing.

10 Claims, 12 Drawing Sheets

U.S. PATENT DOCUMENTS

| | | | |
|---|---|---|---|
| 6,302,601 B1 | 10/2001 | Hagstrom et al. | 400/283 |
| 6,321,649 B1 | 11/2001 | Vangen et al. | 101/35 |
| 6,327,230 B1 | 12/2001 | Miller et al. | 369/30.36 |
| 6,332,680 B1 | 12/2001 | Ozawa | 347/104 |
| 6,447,181 B1 | 9/2002 | Hagstrom et al. | 400/120.01 |
| 6,580,444 B1 | 6/2003 | Drynkin et al. | 347/171 |

FOREIGN PATENT DOCUMENTS

| | | |
|---|---|---|
| EP | 0 799 710 A1 | 10/1997 |
| EP | 1 120 785 A1 | 8/2001 |
| JP | 2002056584 | 2/2002 |

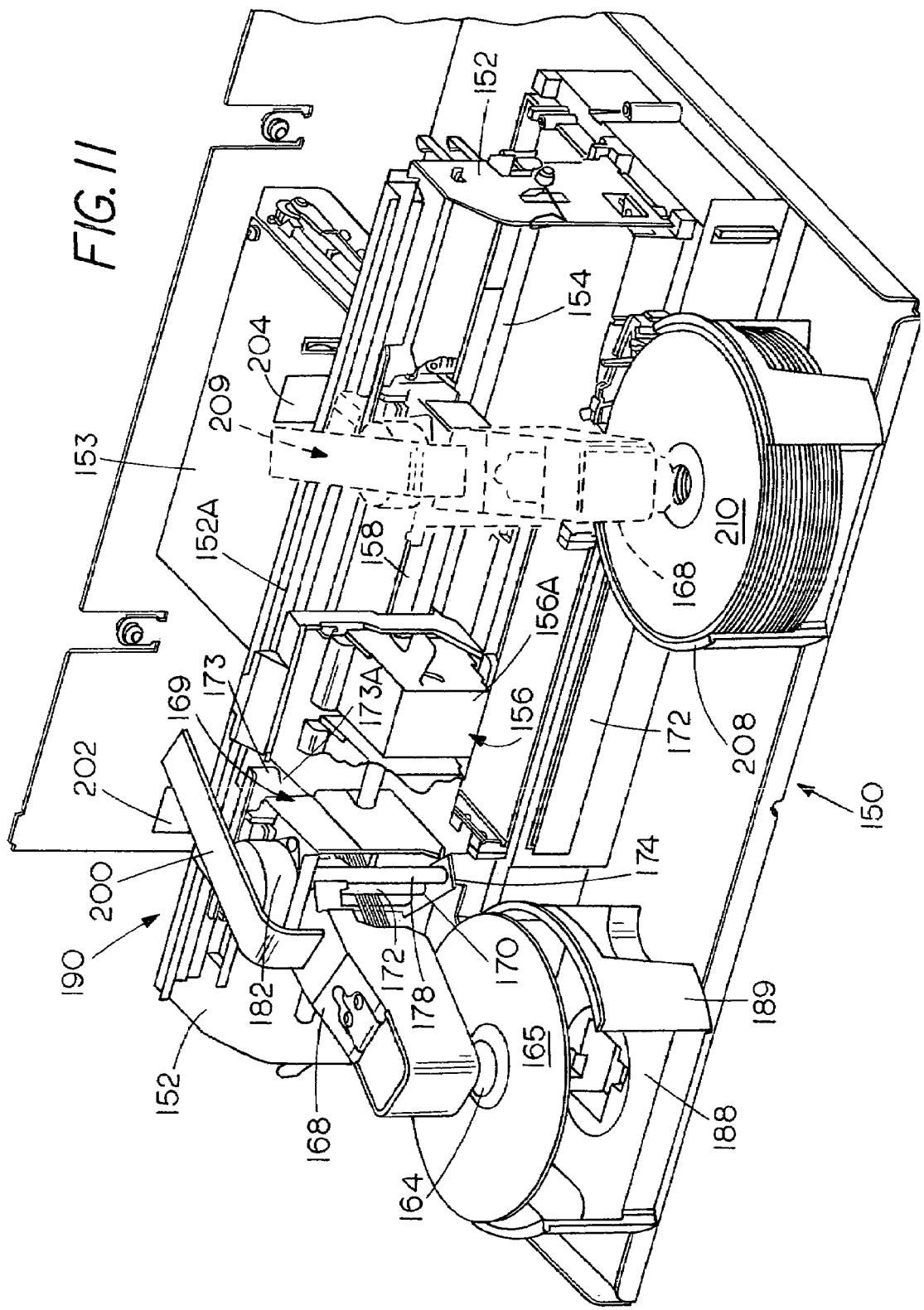

CD RECORDER AND PRINTER

CROSS REFERENCE TO RELATED APPLICATION

This application is a continuation of application Ser. No. 10/447,503, filed May 29, 2003 now U.S. Pat. No. 7,061,515 which in turn was a Continuation-In-Part of application Ser. No. 10/162,363, filed Jun. 3, 2003. U.S. Pat. No. 6,760,052, issued Jul. 6, 2004 and the benefit of priority on application Ser. Nos. 10/447,503 and 10/162,363 is hereby claimed, and the contents of those applications are incorporated by reference.

BACKGROUND OF THE INVENTION

The present invention relates to a combined disc recorder and label printer for recording digital information on compact discs, including music, video recordings, and any other type of information recorded on plastic discs. Printing label information onto the disc at the time of recording completes the processing of the disc.

Apparatus for printing on plastic discs have been advanced in the art where a recorder for a disc is combined in the same unit as a printer as shown in U.S. Pat. No. 6,327,230. However, the device shown in U.S. Pat. No. 6,327,230 includes a vending sequence, and uses entirely different mechanisms for the printing and the recording. The disc "pick" or holder that transports the disc between various stations is separate from the printer.

The handling of discs that have center openings, including lifting a single disc from a stack of discs or individually from a tray or support is well known. A number of different types of "picks" or grippers have been advanced including a pick or gripper shown in Costas U.S. Pat. No. 5,873,692, as well as other types of grippers such as that shown in U.S. Pat. Nos. 6,111,847 and 5,934,865.

Also, it has been well known to print "label" information directly onto discs. Recording or disc duplication also has been carried out, as shown in U.S. Pat. No. 6,141,298 to Miller, but the combination of an easily used ink jet printer that will reliably print information onto a disc when it is recorded, with a minimum amount of apparatus is desired.

SUMMARY OF THE INVENTION

The present invention combines a compact disc recorder (duplicator or burner) and printer that minimizes the amount of apparatus that is used, and which preferably utilizes a common support shaft for the printhead and the disc transporter for sequencing a disc between processes. The blank discs are generally a plastic disc, and are termed compact discs or "CD's"; DVD's; and recordable DVDs, mini discs and name badge discs. The peripheral shapes are not only circular, but can be rectilinear or with parallel sides and rounded or curved ends.

In the present invention, a feature is that the printer that is used for printing onto the discs is an inkjet printer that moves along a bearing shaft, with a power drive. The printhead is guided on this shaft in a lateral direction for printing, while the item on which it is recording will be moved in a direction perpendicular to the shaft. As shown the same shaft is used for mounting a disc "picker" or gripper, so that the unit is integrated into one compact assembly, utilizing a minimum amount of individual framework, or supports, making for a more compact arrangement and making more efficient use of the supports. A separate, parallel shaft or guide can be used for the picker mounting.

Specifically, a CD printer of a well known design can be used. U.S. Pat. No. 6,148,722 shows a thermal printer with a CD support tray that feeds a CD past a thermal printhead. The CD or disc support tray drive shown in U.S. Pat. No. 6,148,722 can be used with ink jet printers as well. Disc recorders or duplicators available on the open market can be used in the apparatus of the present invention. The duplicating mechanism and the printer both utilize trays that will extend from the recorder or the printer housing under a control program. The trays extend to a position where a disc can be placed onto the respective tray fort the respective operation. The blank discs are stored in a stack or storage area, and are lifted with the disc gripper or picker head that is mounted on a vertically moveable arm. The arm is supported on a carriage that slides along a bearing shaft which also is used for mounting the printhead.

The operations can be sequenced. For example, the blank disc can be picked from the supply and moved to a position overlying the tray for the disc burner or recorder when it is extended, and then dropped in place. The programmed control will cause the disc to move into the CD burner or recorder, and after the information is recorded, the tray will be moved back to the extended position where the disc is accessible for the disc gripper or picker to lift the disc up from that tray and hold it in a raised position clearing the tray of the CD burner or recorder.

The program will then cause the recorder or burner tray to retract, and the printer tray is caused to extend. The printer tray, when extended, will be generally in registry with the position of the burner or recorder tray when the recorder tray is extended, so that the disc can be moved down from its raised position by the gripper or pick down onto the printer tray. The CD is released, the picker is retracted and the printer then will be operated to print label information according to a program onto is done, the program control will cause the picker to again lift the CD from the printer tray and transport it to a storage area where the finished disc or CD is stacked.

The picker or gripper is mounted onto an arm that is on a carriage mounted on the same bearing shaft and support as the printhead for the printer. This eliminates separate mountings, and makes the assembly much more compact and also increases reliability. The carriage for the disc pickup arm releasably latches onto the printhead for movement along the rail. This eliminates the need for a separate drive for the picker or grip carriage. The grip or pick is moved vertically with a separate threaded rod driven by a stepper motor. The alignment of the disc with the tray is greatly simplified.

In a second form of the mounting for the picker arm, the arm will swivel or pivot about the axis of the arm mounting to the vertical support screw. The swivel will permit the picker to overlie CD storage hoppers that are spaced farther apart than with a non-swiveling arm. The arm will move clockwise a limited distance as it reaches the end of travel of the carriage in one direction, and swivels in an opposite direction as it reaches the end of travel in the other direction.

BRIEF DESCRIPTION OF THE DRAWINGS

FIG. 11 is a perspective view of a modified form of a printer of the present invention showing a swiveling pick-up arm for handling discs;

DETAILED DESCRIPTION OF THE PREFERRED EMBODIMENTS

Figure 1:
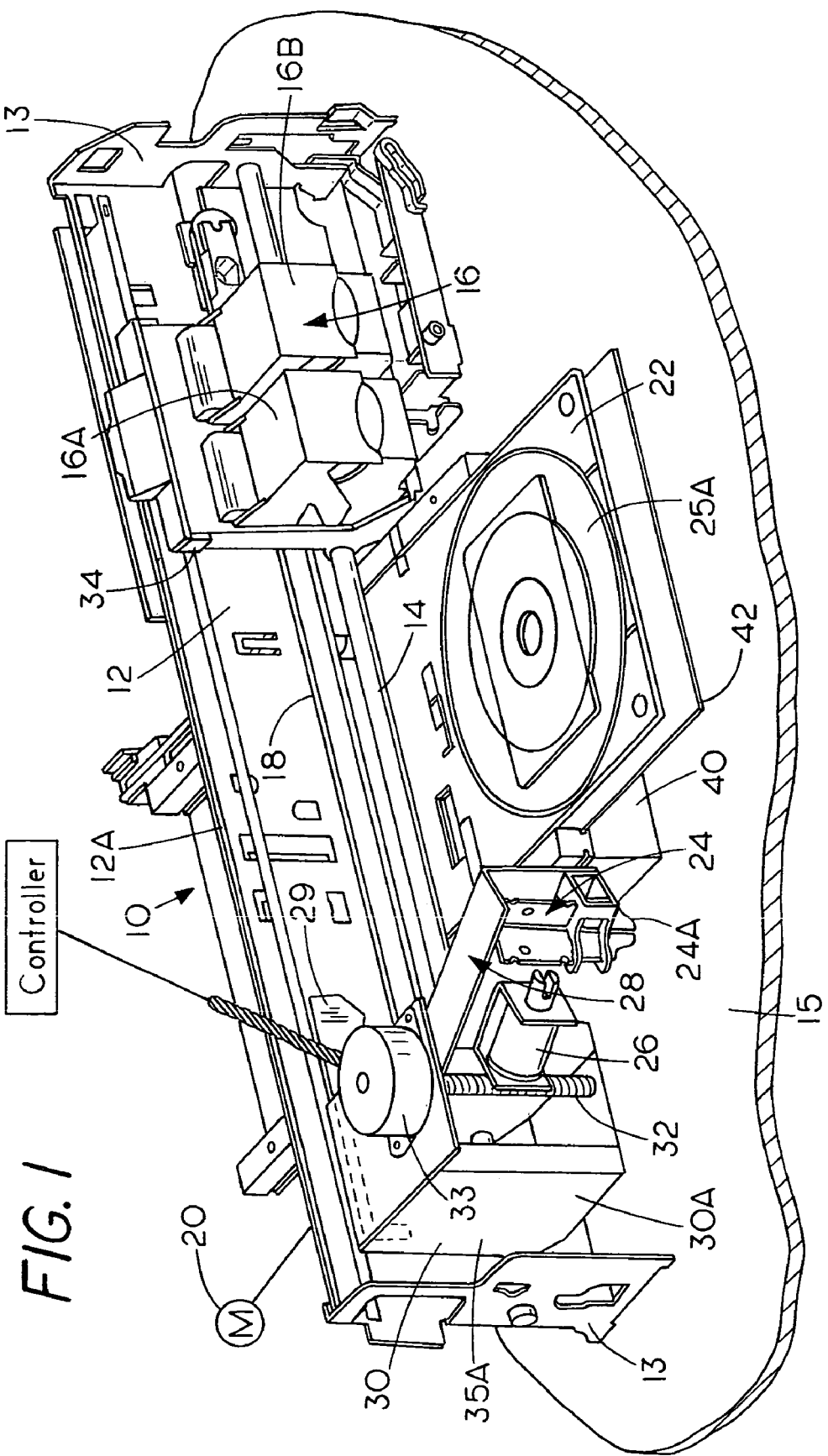
FIG. 1 is a simplified schematic perspective view of a recorder and printer assembly made according to the present invention.

A disc printer and recorder or burner apparatus is shown generally at 10, and includes a frame 12 that extends transversely and has end supports 13 supported on a base plate 15. The frame 12 can be a conventional inkjet printer frame such as that on a Lexmark ink jet printer, made and sold by Lexmark International, Inc. of Lexington Ky., USA, and it provides a stable support for movement of the printhead and other components in a lateral direction. Frame 12 supports a transverse bearing support shaft 14 for slidably mounting a printhead 16. The printhead 16 also has suitable guides at the upper end 17 on a track 12A at the top of the frame 12, so that the printhead 16 is held stable for printing can be moved laterally along the bearing rail 14. The printhead has two ink cartridges 16A and 16B as shown, and the printhead is only schematically shown since the printhead guides for the printhead and printhead drives are conventional on Lexmark printers.

A drive belt 18 for the printhead 16 is driven from a suitable motor represented at 20, the drive is a conventional drive used for inkjet printheads. The drive moves the printhead 16 along the shaft 14 and is synchronized with movement of the printer tray to carry out the printing operation with a central controller 19.

The printer frame, the guide shaft, the printhead, and the printer head drive, as well as the CD tray and tray drive are conventional.

The central controller 19 is provided for controlling the various operations of the apparatus 10 including controlling the printhead motor 20, and as will be the explained, controlling the recording of the CD and printing a label on the recorded CD operations.

The printer includes a CD printer housing 23 that has a disc support tray 22 for a compact disc, which is to have a label printed thereon. A disc or CD 25A is illustratively shown in position on the tray. When a disc 25A is on the tray 22, the tray can be moved so that it is in a position as shown in FIG. 1. The tray is movable under a positive, coordinated drive relative to the printhead 16, for printing on a disc on the tray. The tray 22 is moved inwardly and outwardly from housing 23 perpendicular to the printhead bearing shaft 14, while the printhead 16 travels along the bearing shaft 14 for the printing job, generally within the showings of the printer and printer feed in U.S. Pat. Nos. 6,148,722 and 6,302,601. While the print tray 22 is shown extended in FIG. 1, the recording or burning operation on the disc will take place first, before the printing operation is carried out.

Figure 2:
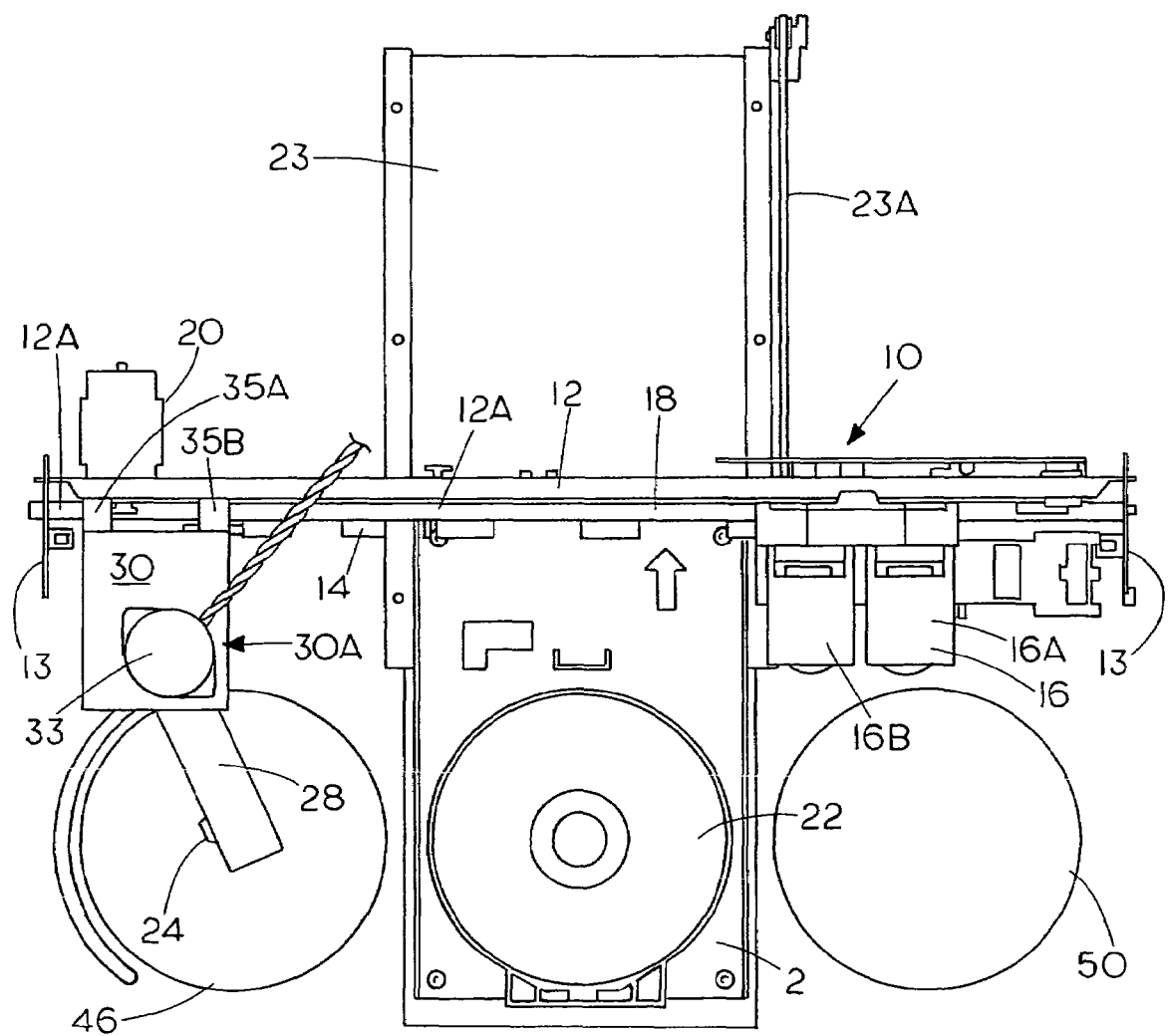
FIG. 2 is a schematic top plan view thereof showing a layout of components.
Figure 3:
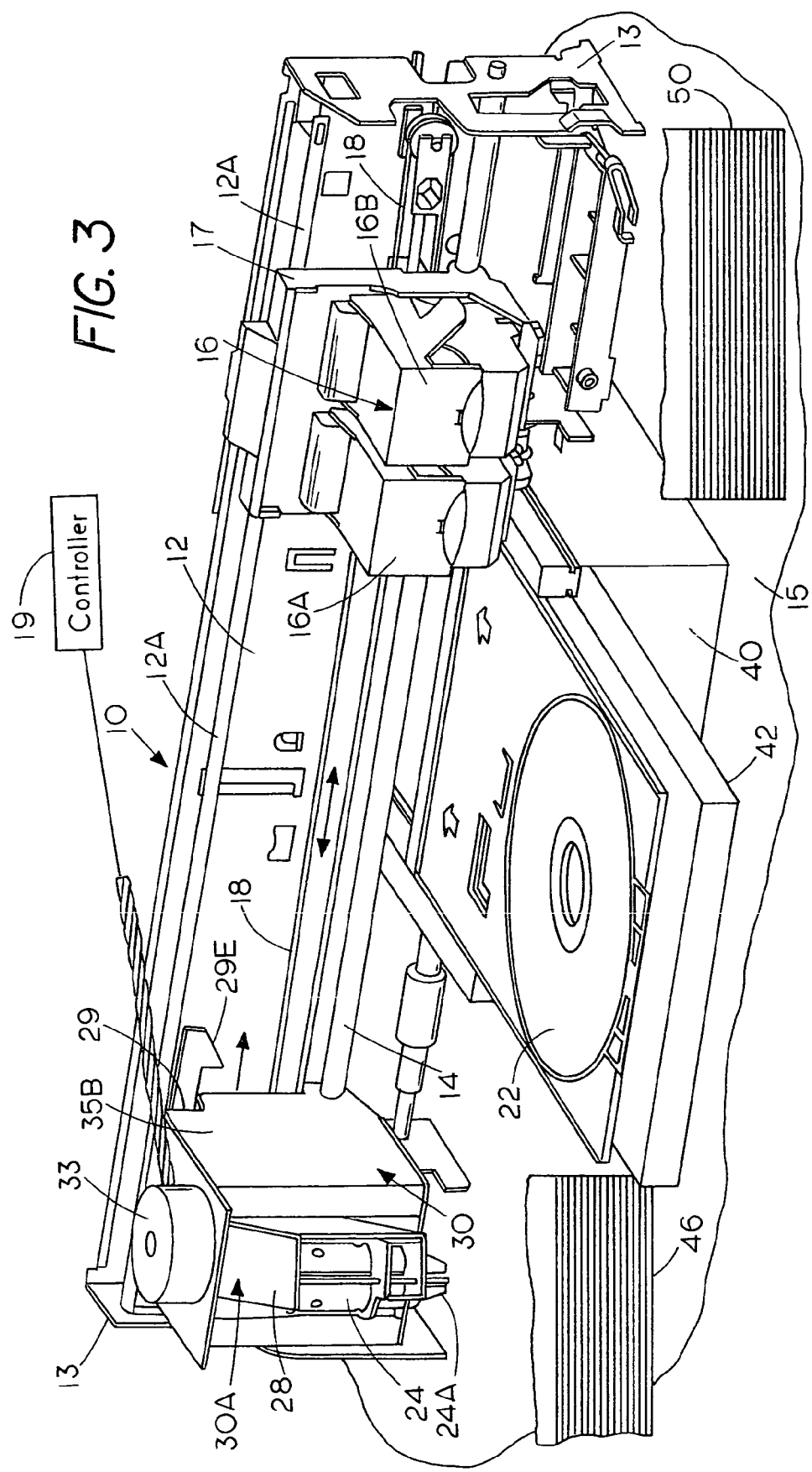
FIG. 3 is a simplified, schematic perspective view of the device in FIG. 1 taken at opposite angle from FIG. 1.
Figure 4:
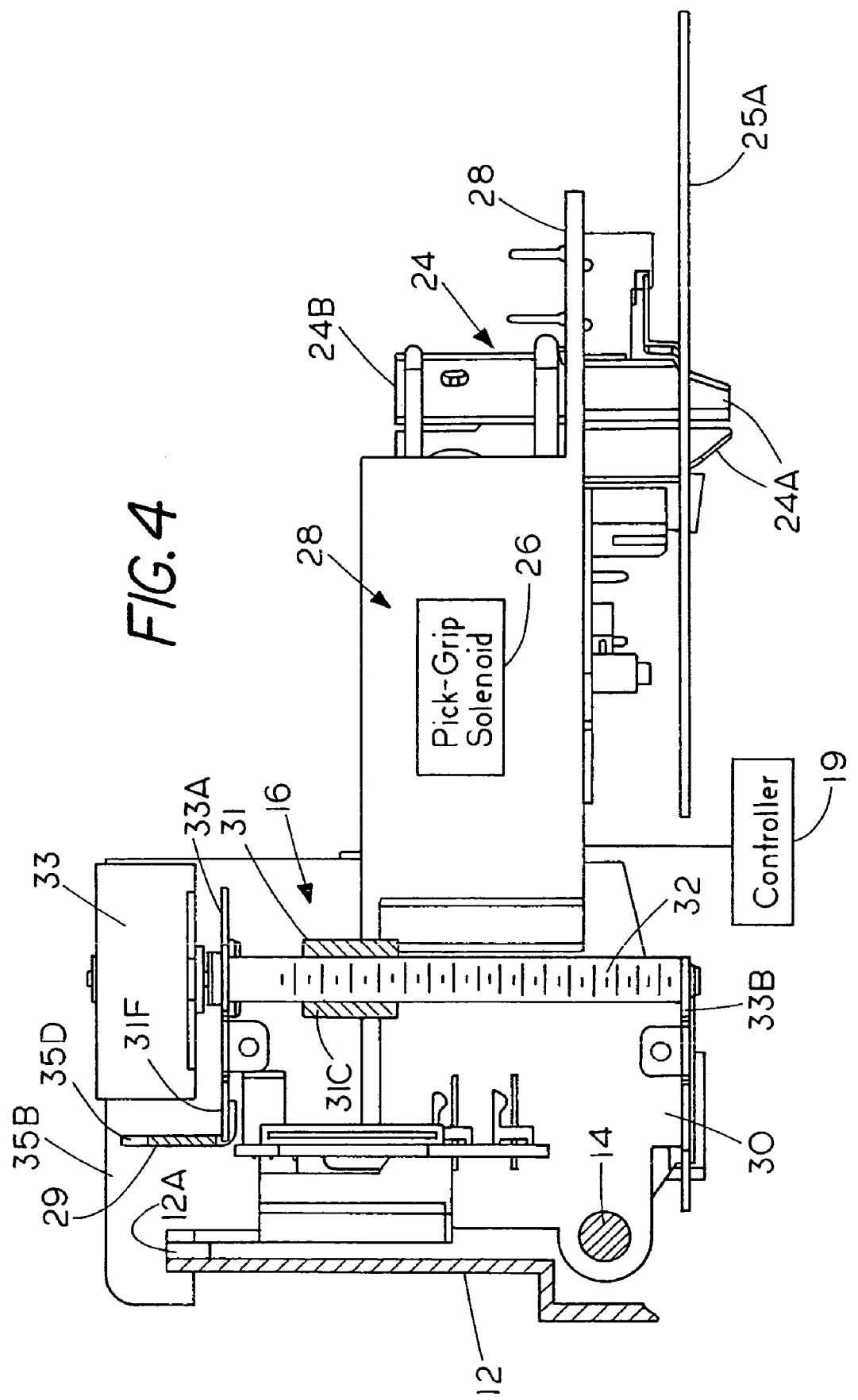
FIG. 4 is a sectional view taken as on line 4—4 in FIG. 5.

The discs or CD's 25A have standard center openings, and in order to handle the discs, a disc transport mechanism 30A including a carriage 30 and a disc gripper or picker illustrated at 24, which is mounted onto an arm 28, in a suitable manner. The gripper 24 can be of any desired form, but as shown it has three vertical finger blades 24B that have ends 24A that will slip into the opening of a compact disc. A solenoid 26 that is also mounted on the arm 28 will be actuated to spread the ends 24A of the gripper blades 24B to engage the inner surfaces of the opening in the center of a CD to be handled. While FIG. 1 does not show the supply of blank CD's, the stack is represented at 46 in FIGS. 2 and 5, and the stack underlies or is below the arm 28 and gripper 24 when the gripper is at a "home" position at one end (the left end in the figures) of the frame.

The arm 28 and the solenoid 26 are mounted onto carriage 30, forming part of the disc transport mechanism 30A. The carriage 30 is slideably mounted onto the same bearing shaft 14 as the printhead 16 and also can engage the guide edge 12 for stability. The carriage 30 is moved along the bearing shaft 14 by latching or hooking it to the printhead 16 and using the printhead drive belt 18 and motor 20 for positioning the handler carriage. The latching or hooking action, and movement of the carriage 30 is under overall control of the controller 19.

The carriage 30 has a central block 31 that has hubs 31A guided on a pair of vertical posts 31B. The center block 31 also has a threaded hub 31C that is threadably mounted onto a vertical threaded rod or post 32. The rod or post 32 is rotatably supported on upper and lower plates 33A and 33B of carriage 30. The threaded rod or post 32 moves with the carriage and the arm 28 is supported on the post, and can be moved in vertical directions along the post 32, by rotating the post with a stepper motor 33. The motor 33 is on a top plate 33A of the carriage 30. The motor 33 will rotate the post 32 under control of the controller 19 to move the arm 28 up or down. The carriage 30 also has a pair of upright guide and support walls 35A and 35B connected between plates 33A and 33B. The guide walls 35A and 35B have guide hooks 37A and 37B that fit over the guide rail 12A for slidable guiding.

The movement of the carriage 30 along the bearing shaft 14 and as guided by rail 12A is accomplished by releasably attaching the carriage 30 to the printhead 16, utilizing a latch lever 29 that is pivotally mounted on upright wall 35A of the carriage 30. The catch or latch lever 29 fits in a slot 35C and its base end 35E is mounted at a pivot pin 29A that is held in the wall 35A. The lever 29 also passes through a slot in wall 35B and has a catch or hook 29B (FIGS. 5, 6, 7, and 8,) at the outer end. The hook 29B on catch lever 29 will pivot up when a ramp edge 29E is engaged by a catch, as shown, a lug 34 on the printhead, as the printhead is moved against the carriage 30. The arm 28 can be raised so a flange 31F on block 31 engages a tab 29T to lift the hook 29B. The hook 29B can be raised to a level to clear a lug or catch 34 on the printhead 16.

The vertical position of arm 28 where a CD held in the gripper 23 is in position to be transported between stations is lower than the portion where it will lift the latch lever 29. The printhead can be quickly moved against the carriage 30 for latching automatically by driving belt 18.

The latch lever 29 can be spring loaded to urge the hook end 29B downwardly if desired. The belt 18 and motor 20 is used for driving the printhead 16 along bearing shaft 14. The connection with the latch lever 29 will cause the carriage 30 to also slide along the bearing shaft 14.

Figure 5:
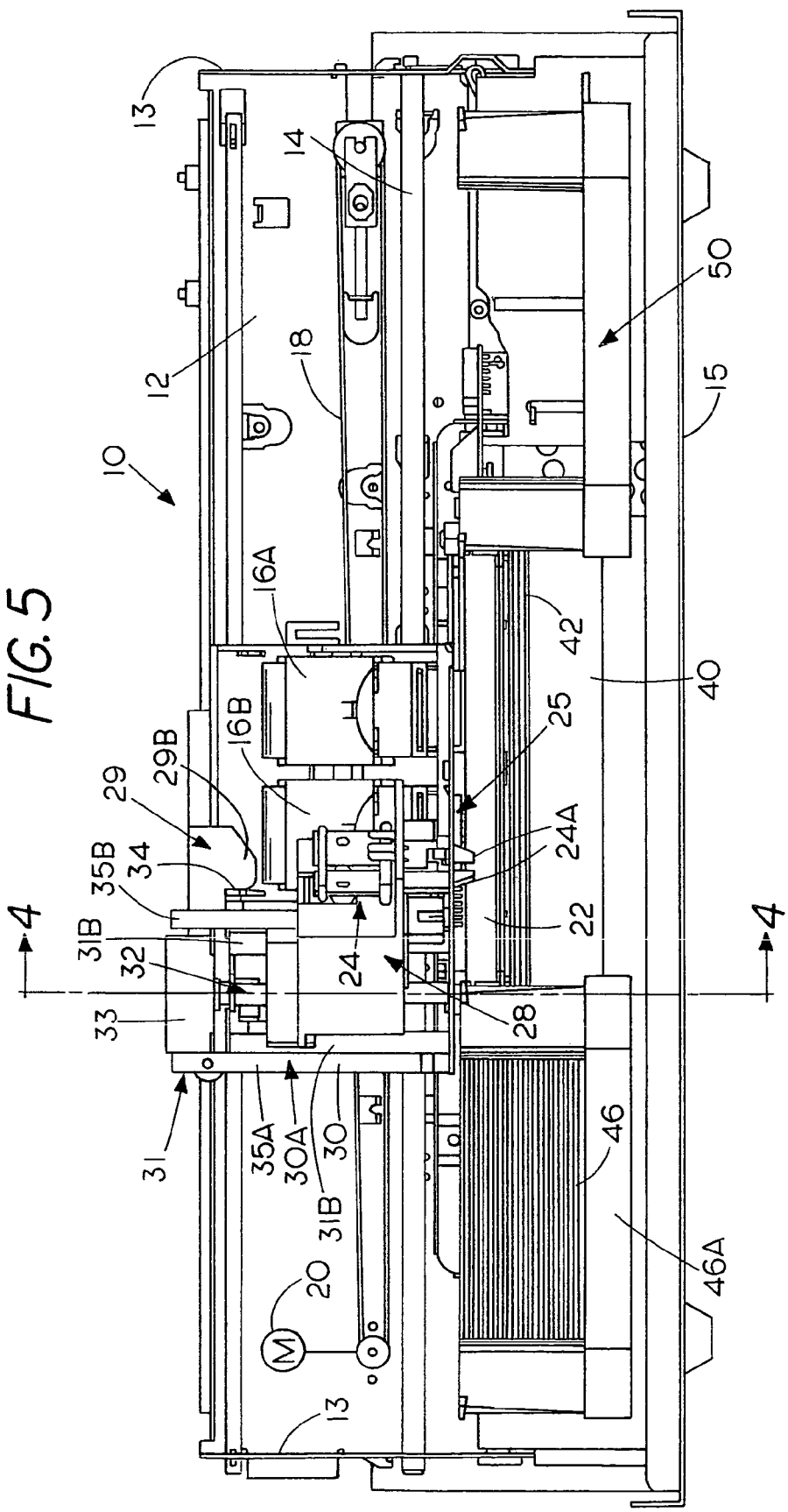
FIG. 5 is a front elevational view of the CD recorder and printer of the present invention.
Figure 6:
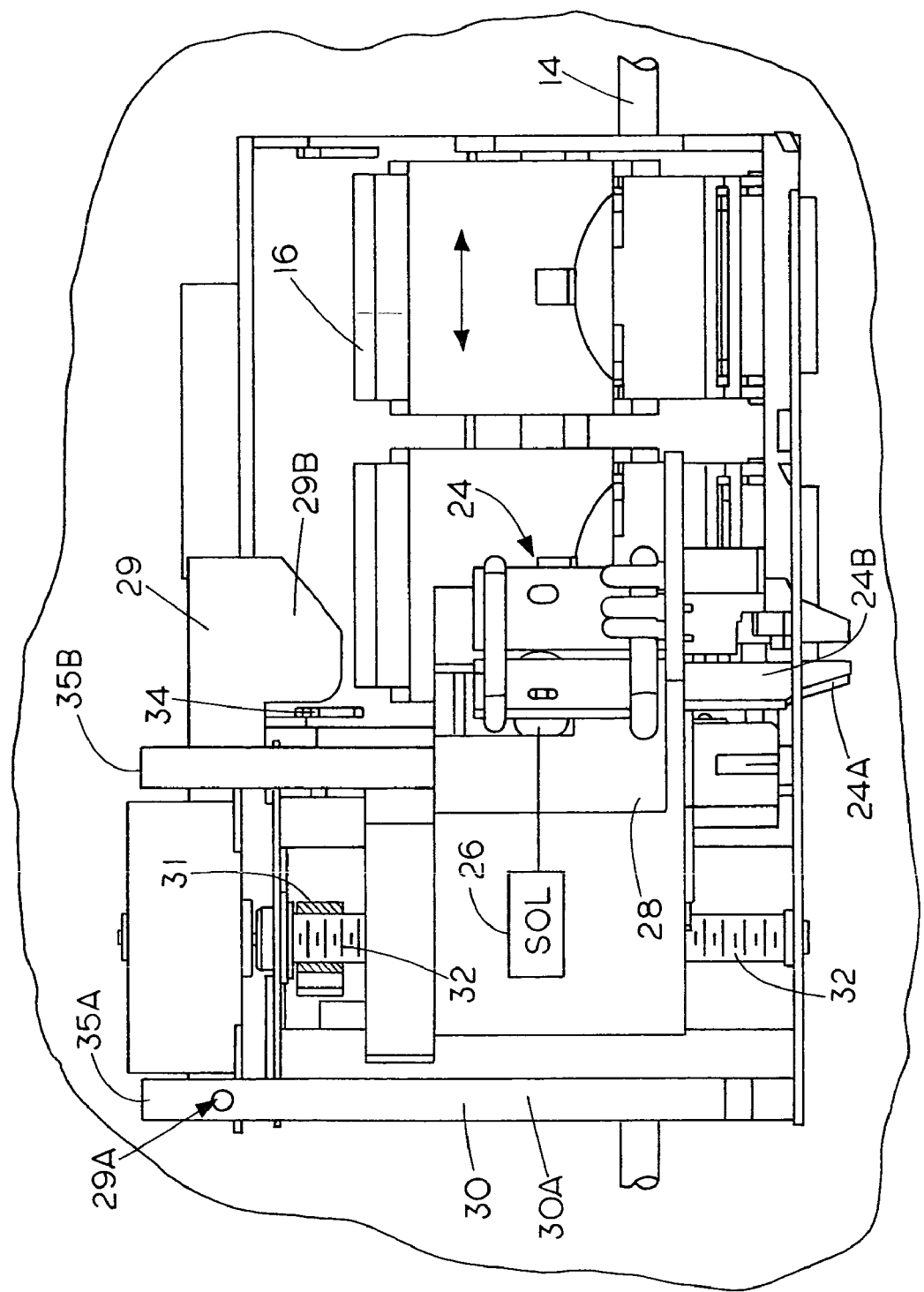
FIG. 6 is a front view of a printhead and carriage in a position latched together.
Figure 7:
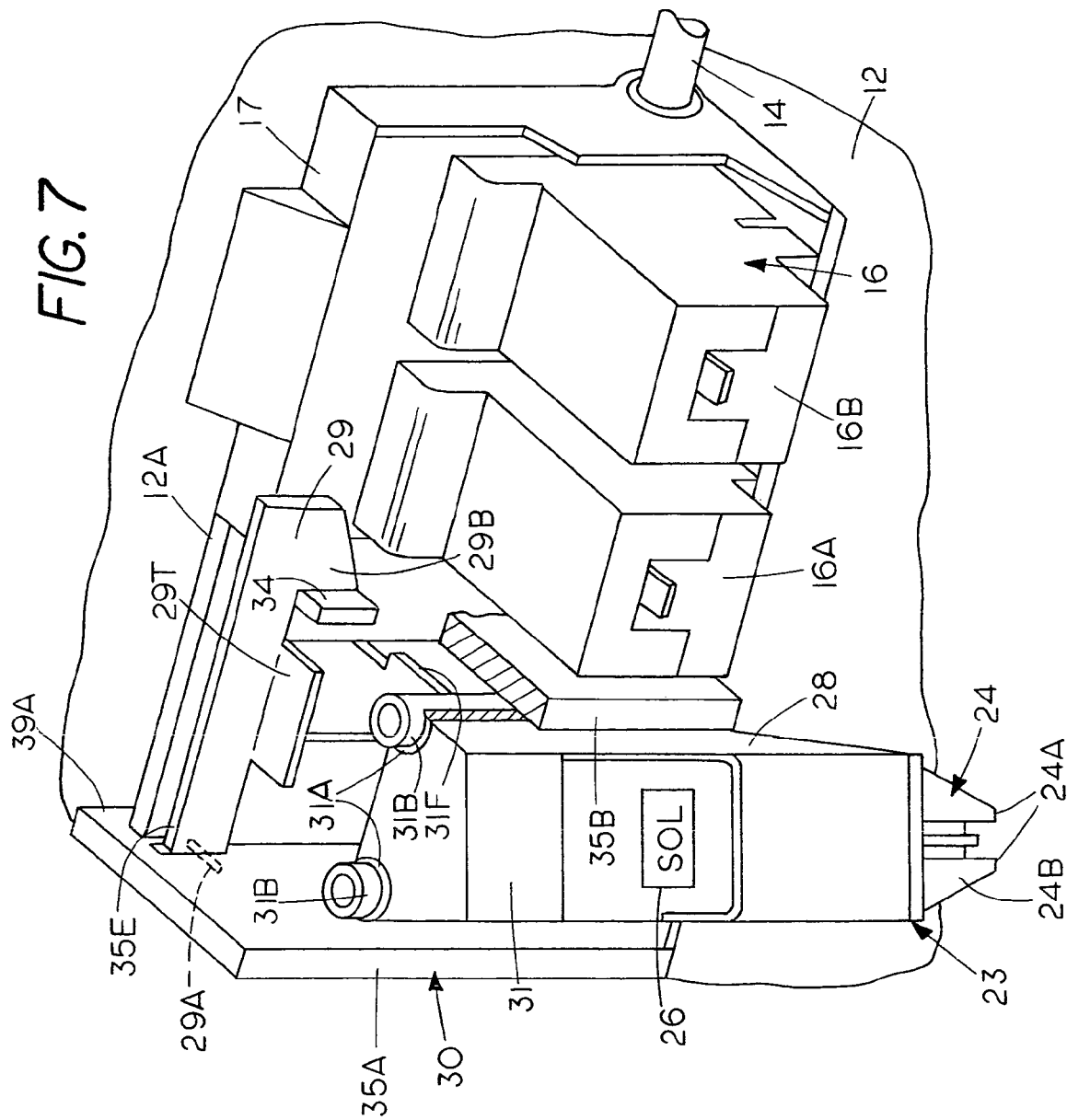
FIG. 7 is a perspective view showing the mounting of a latch lever and arm actuator of the present invention.

In operating the recorder and printer through a cycle, first the arm 28 is moved downwardly so the gripper 24 engages a blank disc 25A from the supply stack 46 in a storage tray or hopper 46A (FIG. 5). The solenoid 24 is activated so a CD or disc is gripped. The arm 28 then can be raised by driving motor 33 to the position where the disc that is held in gripper 24 can be moved laterally. The printhead 16 is moved by motor 20 operating belt 18, and is lateral to the carriage 30 either before or after picking up a blank disc.

When latching the printer to the carriage, the printhead 16 is moved against the carriage and the lug or catch 34 will ride on the tapered edge 29E on the latch lever 29 until the hook end latches to hold the carriage 30 to move as the printhead is moved to the right in the drawings with the printhead 16.

The disc arm transport 28 is positioned at an angle to the axis of bearing shaft 14 supporting the carriage 30 such that when the carriage 30 is all the way to the left in FIGS. 1 and 5, the gripper or pick 24 will overlie the stack 46 of blank discs. After lowering the arm 28 to pick up a disc, and hooking the carriage 30 to the printhead 16, the carriage is moved to the right by moving the printhead 16 using the belt 18 and motor 20. The disc gripper or pick on arm 28, and a disc that is carried by the gripper are moved to come into registry with a center recording and printing position In addition to the printer housing 23, which includes a drive 23A for tray 22, a disc recorder or burner 40 of conventional design is positioned below the printer housing. The recorder operating system also is controlled by the controller 19. Recorder 40 can be of the same type that is shown in U.S. Pat. No. 6,327,230. This recorder has a CD or disc support tray 42 that extends from the recorder housing to the position generally as shown in FIG. 1 using the controller 19 operating the recorder internal drive for loading blank disc. The loading position of the recorder disc support tray is directly below, or in other words in registry with, the position of the printer disc support tray 22. When the printer tray 22 is retracted into the printer housing 17, the recorder tray 42 will be in a position to receive a blank disc 25 from the picker 24 on the arm 28. The printing tray 22 will be retracted into the printer housing 23 during the recording operation.

Once the blank disc 25 is deposited on the tray 42 and released by the picker, the tray 42 will be retracted into the burner or recording housing 40 for the recording operation. The retraction and recording operation is under control of the controller 19, with the inputs being selected by the user. The recording sequence is selected by the operating program of the recorder, which can be as provided by the recorder manufacturer, and the particulars of the recording operation form no part of the invention.

Once the recording is completed, the tray 42 will be extended back out to the position shown in FIG. 1, but printer tray 22 will remain retracted. The recorded disc is picked up with the picker 24, and the arm 28 is moved up to raise the disc sufficiently to clear the level of the tray 22. The tray 22 then will be extended from the printer housing, (the tray 42 can be retracted) and the arm 28 lowered and the picker 24 released to place the disc that had just been recorded in printer tray 22. The disc label printing operation will then take place.

Figure 8:
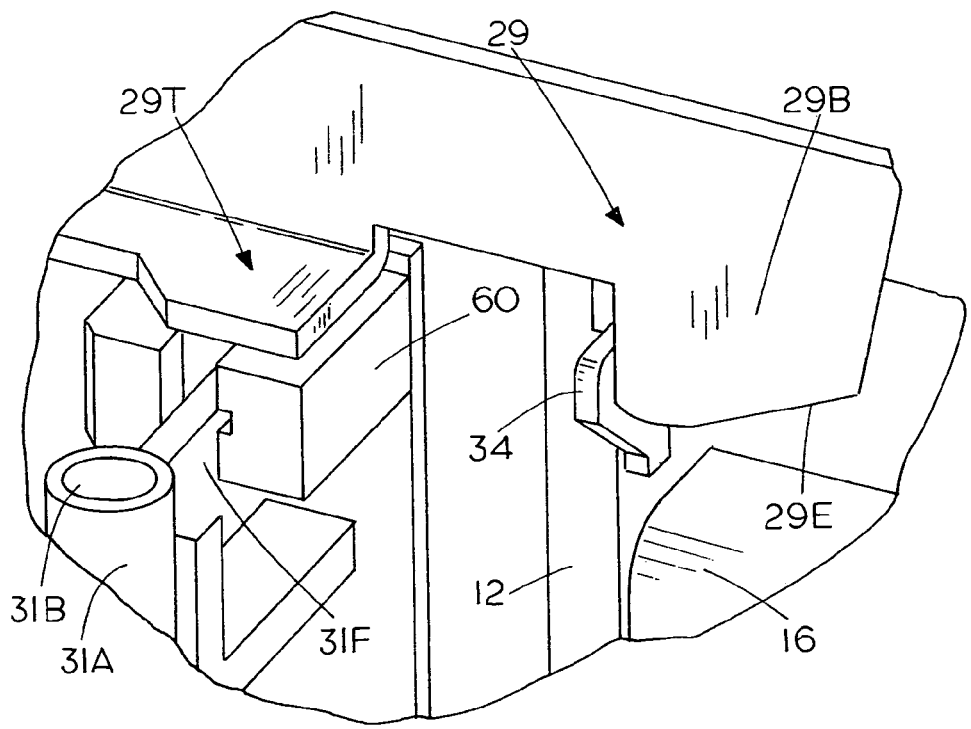
FIG. 8 is an enlarged perspective view of the latch lever in position latched to the printhead.

During printing, preferably the carriage 30 will be moved to its rest or home position shown in FIG. 1, (by pushing it to the left with the printhead) and disengaged from the printhead by moving arm 28 to lift flange 31F to engage flange 29T to lift latch lever 29 to release the carriage 30 from the printhead. This vertical position of the arm 28 is higher than the position of the arm as the disc is moved laterally. The position can be sensed by a position sensor 60 (FIG. 8).

The printhead 16 will then be operated along the bearing shaft 14 and guide rail 12A in a normal manner, moving back and forth as controlled by controller 19 driving motor 20 and belt 18, while the tray 22 will be moved perpendicular to the guide shaft 14, under control of a tray drive.

After the printing is done, the printhead 16 will be moved over to the left in FIG. 1, and again latched to the carriage. The lug 34 lifts the latch lever 29 by sliding on edge surface 29E. When the hook 29B engages the lug or catch 34 on the printhead 16 the carriage 30 can be moved to pick up the finished (recorded and printed) disc and move the finished disc 25 to a storage tray 50, on the right hand end of the device 10, as shown in FIGS. 1 and 5, or to a center storage location as shown in FIG. 9.

The latching of the carriage 30 to the printhead provides for an efficient use of existing components to achieve a new combination. The carriage 30 for the disc handling gripper 24 is preferably mounted on the same bearing shaft 14 and other guides on frame 12 as the printhead 16, (but can be on separate or parallel guides) and is moved by moving the printhead 16 using existing motors and drive. The latch lever 29 can be latched to the printhead automatically by sliding the printhead under the latch or by raising the catch lever with the arm 28 before moving the printhead under the latch lever.

The process will then be repeated as desired. There is no need for a pivoting tower that is provided in various duplicators, there is no need for a separate independent drive for the disc transport mechanism.

Figure 9:
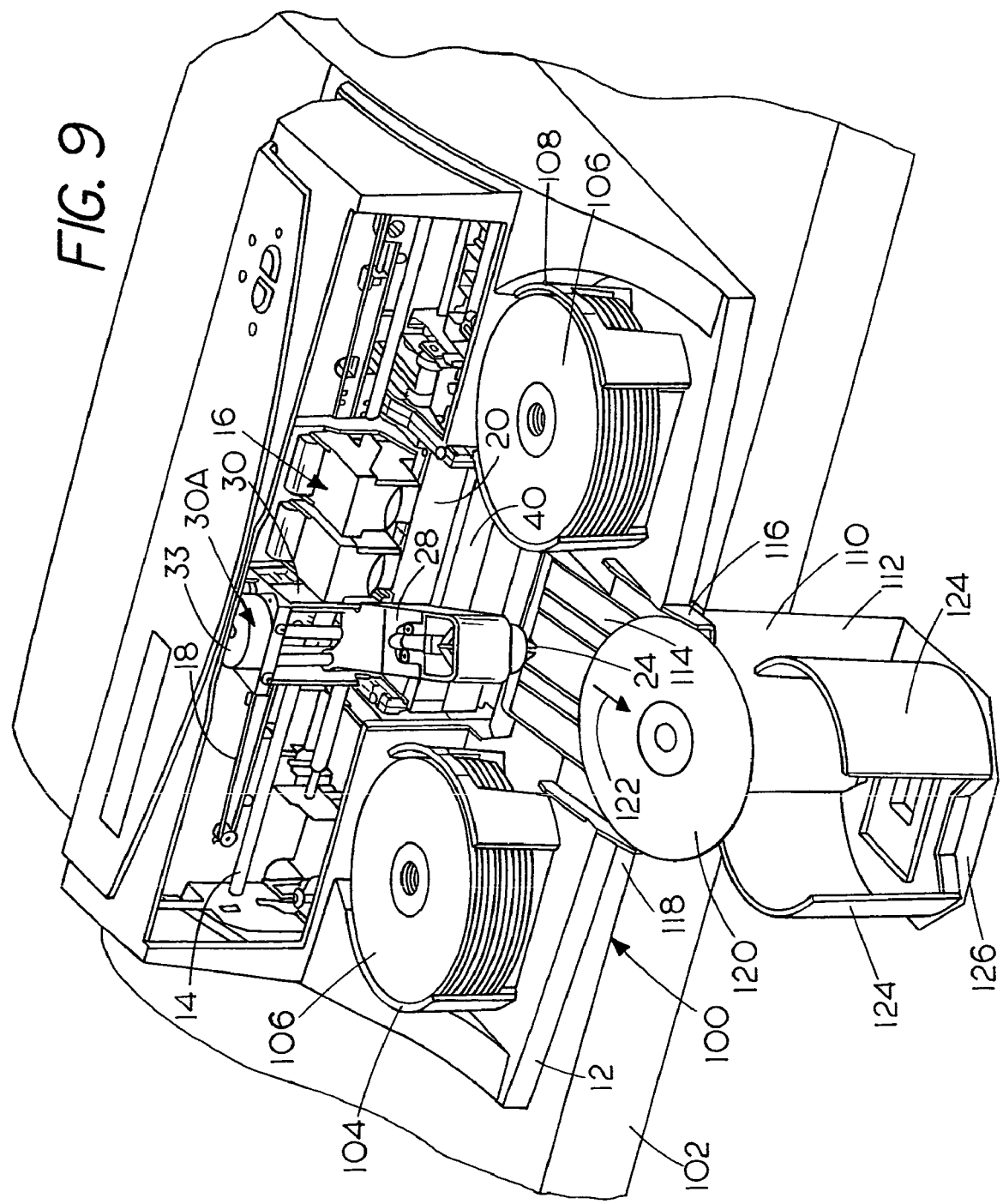
FIG. 9 is a front perspective view of a modified form of the invention, showing an expanded disc storage.
Figure 12:
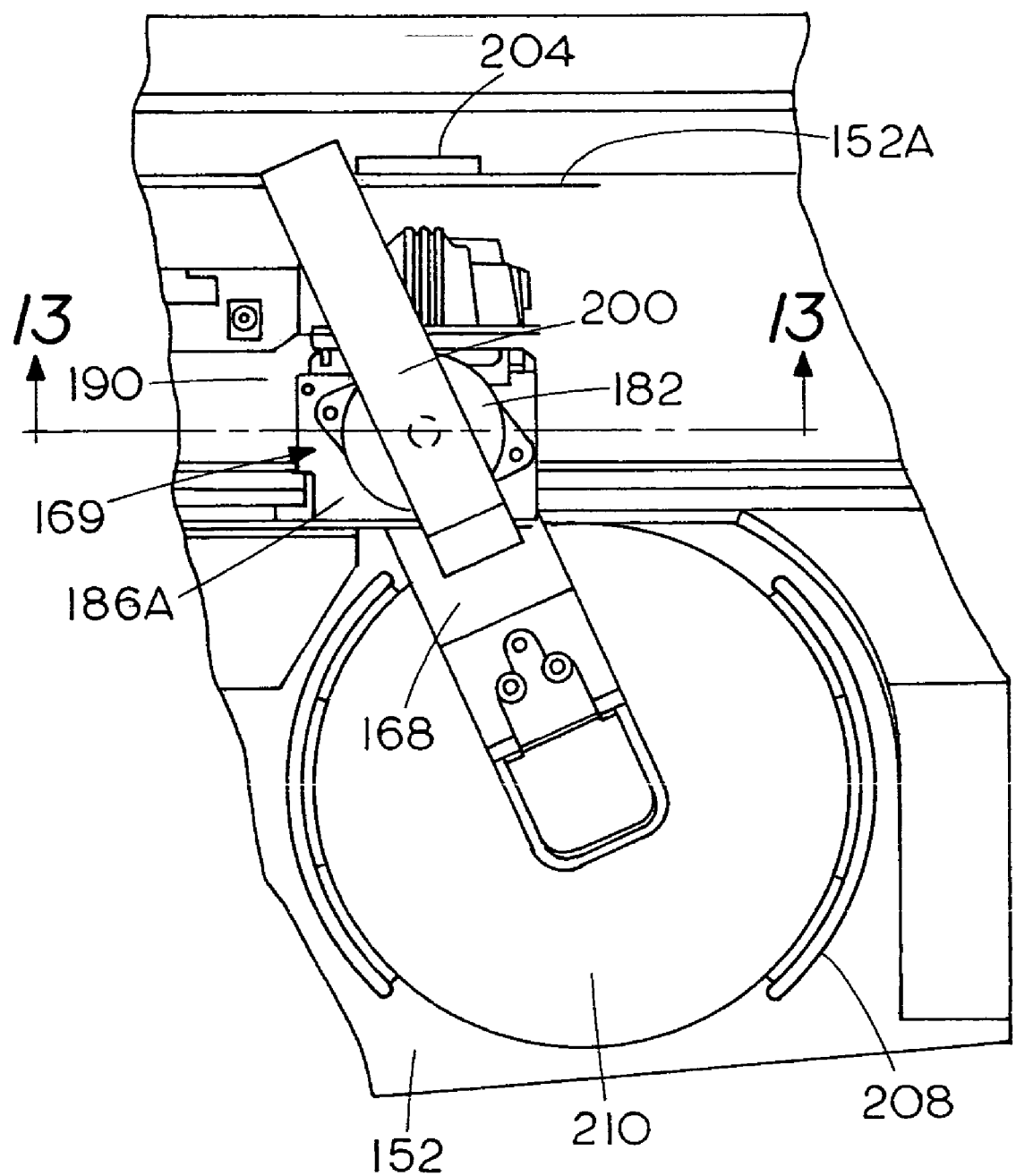
FIG. 12 is a fragmentary top plan view of the right hand side of the printer of FIG. 11 showing the swiveling arm in a solid line position after it has swiveled counterclockwise about its mounting.

In FIG. 9, a modified version of the printer CD recorder and printer of the present invention is indicated at 100. In this form of the invention, the printhead and carriage latching remain the same, and while FIG. 9 may show some additional details, the operation of handling, recording and printing discs is the same as previously described. In this instance, a support top 102, such a work top, table or the like is provided, for supporting the frame 12 in position. The frame 12 includes the main bearing support shaft 14 on which the printheads 16 will be moved, along with the printer drive belt 18 which is driven from a motor in a suitable manner. The printer provided in this form of the invention, is exactly the same, and the disc transport mechanism 30A including the carriage 30 is controlled relative to the printhead 16 as previously described, using a latch lever 29. The picker 24 is operated in the same manner as before, and the stepper motor 33 is driven to move the arm 28 and the picker vertically, as desired.

Programming for recording and printing can also remain the same, but in this form of the invention, the capacity of the CD recorder and printer is increased by using the two disc storage areas or hoppers on the frame 12 as blank disc storage areas. As shown in FIG. 9, a blank disc storage area 104 is on the left side, and has the same guide walls for retaining a stack of discs as the storage area for the stack of blank discs in the previous figures. As can be seen, blank discs 106 are stored in the storage area or hopper 104. A second blank disc storage area or hopper shown at 108 comprises guides that stores another stack of blank discs 106. The location of storage area 108 is the same as that used for thee completed discs in the first form of the invention.

In order to provide for the storage of the same number of completely recorded and printed discs as the blank discs, a completed disc support area or hopper 110 is provided in the center of the frame 12, essentially in alignment with the center bisecting planes of the printer and recorder. The support or hopper 110 has a vertical support wall 112 that attaches either to the bottom of the frame 12, or directly to the tabletop 102, and it is in alignment with an inclined chute or ramp 114 that is in alignment with the disc trays of the printer 20 and recorder or burner 40. The chute 114 extends from an upper level below and adjacent to the disc tray 42 of the burner or recorder 40, downwardly to an outer trough portion 116 that has guide flanges 118 for guiding a completely finished disc indicated at 120 as it slides down the chute or ramp. The upper end of the chute or ramp 114 is underneath the outer end of the arm 28 and gripper 24, so that when the arm 28 and gripper 24 have been used to lift and remove a completely finished disc from the printer tray 22, the disc 120 can be lowered by operating the motor 33 to lower the arm the amount desired, and the disc will drop down to the ramp 114, where it will slide as indicated by the arrow 122 to come between the guides 124 on the support area or hopper 110. The guides 124 are part circular, as shown, and are supported on a horizontal base member 126 of the support 110 that is attached to the vertical wall portion 112.

The guides 124 are part cylindrical and made so they will provide for a storage of the number of finished discs equal to the blank discs 106 in both of the storage areas 104 and 108. For example, with 25 discs in each of the storage areas 104 and 108, the support or hopper 110 is made to hold 50 finished discs.

Thus, the disc recorder and printer assembly remains compact. The finished disc support 110 can be placed in position after the frame 12 has been located on a work top or table 102.

The center bisecting plane of the finished disc support 110, which is perpendicular to the guide shaft 14, defines the center line along which the disc 120 that is finished and released by the gripper 24 will slide. The plane bisects the trays 22 and 42 that support the disc during the operations of printing and recording. Thus the finished disc support is centered on the bisecting plane of the printer. The blank disc storage areas or hoppers 104 and 108 are spaced essentially the same amount on opposite sides of this plane, so that the arm 28 can be easily manipulated to pick up the blank discs, and deposit them first in the recording tray, and then the printing tray. When fully finished the gripper and arm are used to lift the disc out of the printer tray and deposit the finished disc onto the slide 114 for storage.

Figure 10:
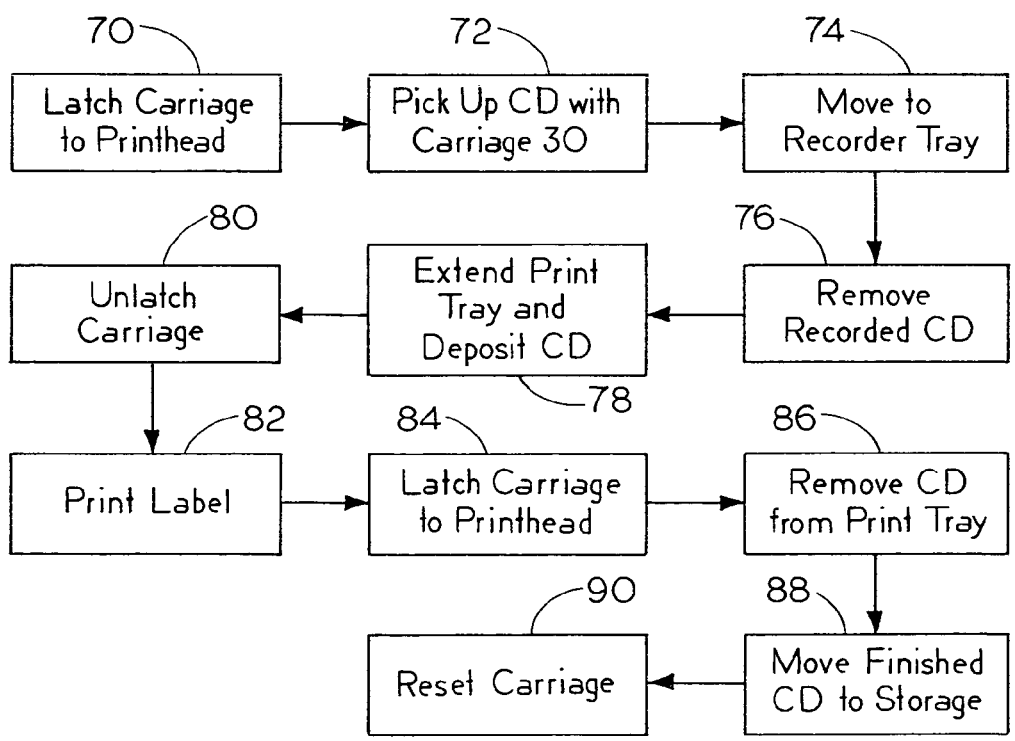
FIG. 10 is a block diagram illustrating a process of the present invention.

In FIG. 10, a block diagram showing the process for operation of the present invention is illustrated. A block indicated at 70 is the start of the process. The carriage 30 is kept latched to the printhead except when printing takes place, so the position of the carriage 30 is known and controlled. A blank CD is picked up by the carriage 30, using the "picker" 24 as shown in block 72.

The printhead 16 is driven, and moves the carriage 30 along with it to move a blank disc to the CD recorder tray as indicated by block 74. The recording or burning of the CD (or other recordable disc) takes place in the recorder housing. The carriage is moved over the recorder tray and the gripper 24 will remove the recorded CD and the recorder tray will be retracted as shown in block 76. Next, the print tray 22 is extended, and the CD is deposited in the printer tray as indicated by block 78. The carriage can be disengaged from the printhead and moved to its storage position as indicated by the block 80. The label is printed with the label information using the ink jet printhead. This is indicated at block 82. After printing, the carriage 30 is latched to the printhead again as indicated by block 84, and the CD that is finished is removed from the printer tray by operating the "picker" or gripper 24 as indicated by block 86, and then the finished CD is moved to the finished stack, either storage station 50 or support 110, as indicated by block 88.

The carriage is reset as indicated by the block 90, that is it is moved over to the left, and remains latched to the printhead. When the program calls for another recording and printing, a new blank CD or disc is taken from the storage area and the process is repeated.

The ability to move the carriage that carries the CD between the blank storage station or station, the printing and recording station, and the finished CD station using the printhead drive reduces the complexity and cost of the CD transport or pick arm, as well as providing rapid easily controlled operations.

FIGS. 11–14 illustrate a modified form of a transport mechanism 38, the carriage 30 and the arm 28 that was shown in the first form of the invention.

In this form of the invention, as shown in FIG. 11, a printer frame indicated generally at 150 is again a standard printer frame, such as that shown in the first form of the invention and made and sold by Lexmark International, Inc. of Lexington, Ky. It includes a frame 152, that has a transverse bearing support shaft 154 slidably mounting printheads shown at 156. Again, there are double printheads shown, and the printheads can be suitably guided as previously explained on a track 152A at the upper side of the frame 152. The printhead has two ink cartridges, one of which is shown fragmentarily in FIG. 11. The ink cartridges 156A, as previously explained. The ink cartridges are operated through a drive belt 158, that is driven from a motor as shown in the previous forms of the invention, such as conventional drive used for ink jet printheads. The drive, through the belt 158, moves the printhead 156 along the shaft 154 and a synchronized movement of a printer as previously explained. CD printer housing 153 is mounted in the center portions of the printer frame, and includes a tray that moves in and out for printing on a disc, such as a disc 165, as previously explained. The operation of the disc printer, and the CD burner is exactly the same as that previously explained.

In this form of the invention, however, a disc transport mechanism indicated at 169 is modified to include a pivoting arm carriage assembly 170 which is made to mount a picker arm 168. The arm carriage 170 is mounted on but can pivot relative to a frame 169A of the transport mechanism 169. The arm 168, in turn, carries a gripper 164 as previously explained, that will be used for lifting and lowering CDs, DVDs or the like as shown at 165. The operation of the picker has been previously explained, as well. Arm 168 is mounted onto the carriage 170, and the carriage 170 is slidably mounted on the same bearing shaft 164 as the printhead 166, and also can be guided on the frame edge 152A for stability if desired.

The transport mechanism 169 is carried for movement along the bearing shaft 154 by utilizing a latch lever 173 that operates as described for the latch lever 29. The latch lever 173 will latch onto a lug or catch portion 173A of the printer frame 156, so the disc transport mechanism 169 and arm 168 can be moved between the position shown in solid lines in FIG. 11, and the position shown in dotted lines in FIG. 11.

Figure 13:
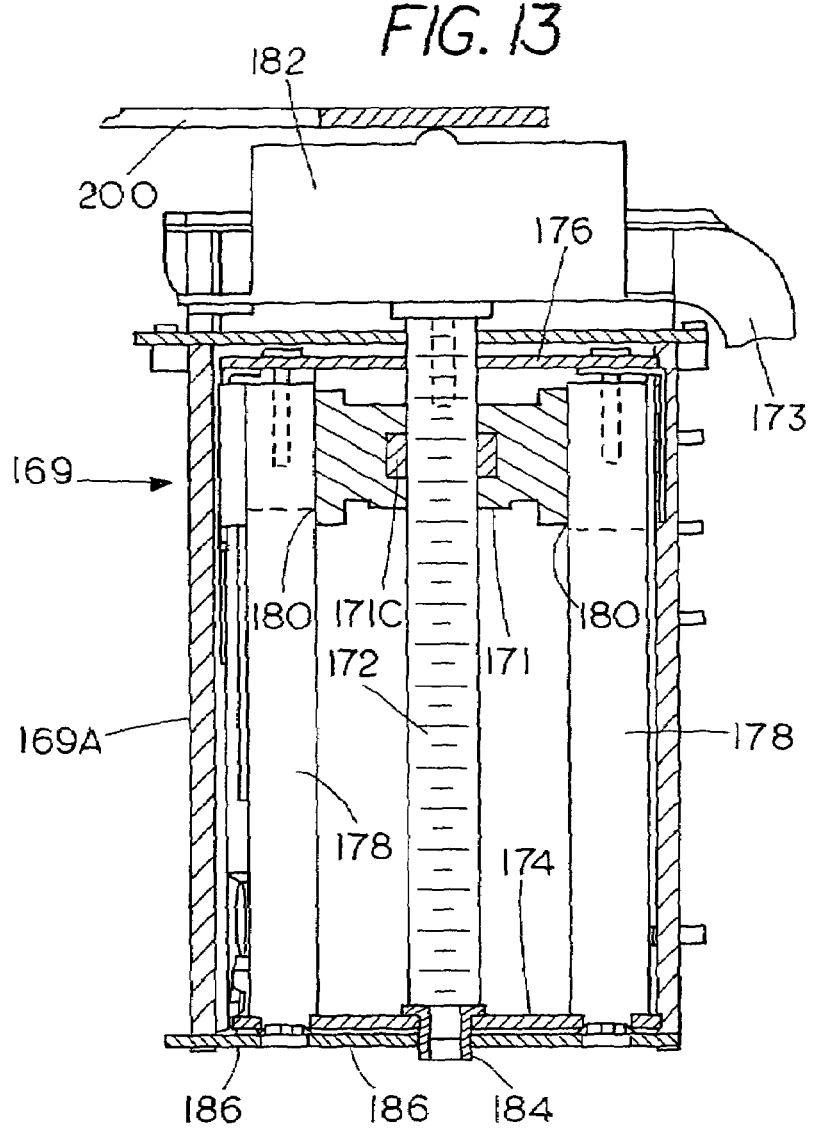
FIG. 13 is a sectional view taken as on line 13—13 in FIG. 12.
Figure 14:
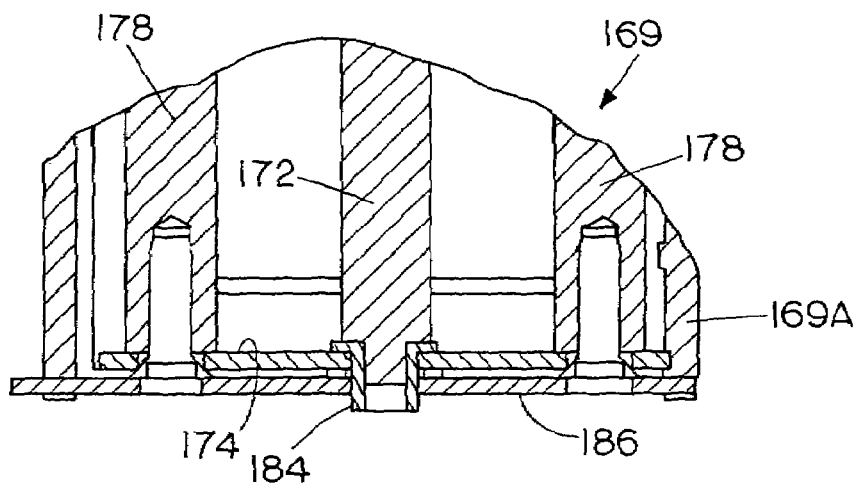
FIG. 14 is an enlarged view of a lower portion of the swivel mounting shown in FIG. 13.

The arm carriage 170 is shown in greater detail in FIGS. 13 and 14, and in this form of the invention, the center block 171 has a threaded central hub 171C that is threadably mounted onto a vertically threaded rod or post 172. The threaded rod or post 172 is supported for rotation on the carriage 170. Carriage 170 includes a bottom plate 174, and a top plate 176 that are supported together on side guide and support rods 178. These guide rods 178 are spaced apart, and move with the plates 174 and 176, in as much as they are attached to the plates by suitable threaded members at the ends of the guide rods. The center block 171 has U-shaped saddle or guide receptacles indicated at 180 to slidably guide along the rods 178, as the screw or rod 172 is threaded, and the hub 171 is moved up and down. The screw or rod 172 is operated with a motor 182 that is mounted on the transport mechanism 169. The motor 182 and screw 172 can rotate relative to the central hub 171C to raise and lower the center block 171. The guides 178 and top and bottom plates 174 and 176 and the arm 168 move with the carriage 170. The carriage 170 is thus mounted for pivotal movement about the axis of screw 172 relative to the frame 169A of the transport mechanism 169. The carriage 170 and arm 168 will pivot about rod or screw 172.

Threaded rod or screw 172 is rotatably mounted in a suitable bushing 184 on the bottom plate 174 and on the bottom wall 186 of frame 169A. It can be seen that the bottom plate 174 is supported with clearance relative to the bottom wall 186 of the transport mechanism frame 169A. Thus, the rod or screw 172 can be rotated by the motor 182 without affecting the pivotal position of the plates 174 or 176 since the guide rods 178 keep the center block from rotating.

The frame 169A and carriage 170 have spring loaded detents that act to detent the carriage in the right and left positions. Detents are well known, and any spring loaded detent ball or other type of detent can be used.

Rotating the rod or screw 172 will cause the center block 171 and hub 171C to move up and down along the rod and carry the arm 168 with it for positioning the picker over a blank CD storage area 188. The blank CD storage area includes a hopper 189 and, upon operation of the gripper 164 after the arm raised from the blank storage hopper 189.

The plates 174 and 176, and thus, the center block 171, which is pivoted with the plates 174 and 176 and the guide rods 178, as well as the arm 168 can be swiveled about the axis of the rod or screw 172. In FIG. 11, it can be seen that the arm 168 has an actuation lever 200 fixedly mounted thereon. The lever 200 extends rearwardly relative to the printer frame, to overlie the rear portions of the upper rail 152. A first stop lug 202 is fixed to the upper rail 152 and protrudes upwardly therefrom. When the transport mechanism 169, including the carriage 170, is moved to its position at the end of the travel for the printhead 146 to the left in FIG. 11, the lever 200 will have struck the lug 202. The carriage 170 will be pivoted about the axis of the rod or screw 172 to the position as shown in solid lines, with the arm is swiveled clockwise from a center position. One end of the plate 174 is inclined outwardly as shown in FIG. 11 (plate 176 is also pivoted), and the arm 168 and the picker 164 have been moved to the left in FIG. 11 a greater distance than a line perpendicular to the upper rail 152. When the latch 173 has engaged a catch portion 173A on the printheads 156, and the printheads have been moved all the way to the right in FIG. 11, the lever 200 will engage a second lug 204 and swivel the carriage 170 counterclockwise. The plates 174 and 176, the guides 178, and the arm 168 swivel counterclockwise to the position shown in dotted lines in FIG. 11. The picker overlies a finished disc storage area 208 for discs 210 that have been printed, and burned in with the CD burner 212 which forms part of the invention as previously disclosed.

Again, the carriage 170 can be detented in its right and left positions, after being pivoted, by engagement with the respective lug 202 or 204. The detent can act between bottom plate 174 of the carriage and bottom wall 186 of the frame 169A.

Thus, by having the arm 168 swivel or rotate about a vertical axis, an extended reach can be obtained for the arm that is greater than the amount of travel permitted by the printheads and printhead carriage. The printheads, with the arm 168 shown in its dotted line position in FIG. 11, would be up against the side panel of the frame 152, and would not be permitted any further movement to the right.

FIG. 14 shows a greater detail on the bushing 184 for the threaded rod or screw 172, and also shows the fastening details for the plate 184 relative to the guide rods 178. Again, the plate 174, the plate 176 and the guide rods 178 swivel as a unit when the lever 200 engages one of the lugs 202 or 204.

It should be noted that the arm 168 can remain in the position shown in solid lines in FIG. 11 for moving a CD to the CD burner and printer stations. The position of the printhead can be programmed to accommodate the arm position.

Other than the ability to swivel about an upright axis on the mounting for the drive to vertically raise and lower the arms, the operation of the printer, and the CD burner shown in FIGS. 11–14 is the same as previously explained.

Again the size of the disc and the peripheral shape can be selected as desired, including business card discs, ID discs, mini discs and the like. The picker can be adapted to suit the discs being handled.

The carriages 30 or 170 can be mounted on a separate bearing shaft and guide rails that let the printhead slide the carriage parallel to the printhead movement. The additional parts for a parallel slide arrangement may increase cost, but they can be used.

Although the present invention has been described with reference to preferred embodiments, workers skilled in the art will recognize that changes may be made in form and detail without departing from the spirit and scope of the invention.

What is claimed is:

1. A method of recording and printing on compact discs utilizing a printer having a printhead, a guide for the printhead for guiding the printhead in a path, a drive for the printhead for moving it along the guide, and a support for an item to be printed that moves laterally to the path of the printhead, and a carriage mounted for movement with the printhead for carrying an item on which printing is applied, comprising attaching the carriage to move with the printhead to selectively move the item to selected positions.

2. The method of claim 1 including picking an item from a store with the carriage, and driving the printhead with the carriage attached to a position with the item aligned with the support.

3. A disc processor for selectively processing compact discs comprising:
a disc processor having a processor disc support for receiving a disc for processing;
a frame for supporting the disc processor and processor disc support, said frame including a guide;

a processor member mounted on said guide and moveable along the guide under a control for processing a disc in the processor disc support; and a disc transport mechanism including a disc pickup head having a disc gripper for holding a disc, said disc transport mechanism being mounted on the frame for movement in a direction along the guide with the processor member to move a disc held by the disc gripper of the disc pickup head as the processor member moves along the guide so the disc pickup head is moved from a disc storage region to the processor disc support;

a disc printer forming the disc processor, the processor member including a printhead controllable for movement along the guide.

4. The disc processor of claim 3, further comprising:

a disc recorder having a second extendible disc support for receiving and dispensing a disc for recording, the second disc support having a loading position; and the transport mechanism being movable with the printhead to deposit discs selectively on the processor disc support and the second disc support.

5. The disc processor of claim 3, wherein said disc transport mechanism has a coupling connecting the disc transport mechanism to the printhead for movement with the printhead.

6. The disc processor of claim 3, wherein said disc transport mechanism comprises a carriage, an arm on the carriage, said arm being moveable generally perpendicular to a plane of the disc support.

7. The disc processor of claim 6, wherein the arm on the carriage is pivotably mounted to the carriage about an axis extending uprightly relative to a support plane of the processor disc support, and the arm being controllable to at least two angular positions that are oblique to the direction of movement of the processor member along the guide.

8. A CD printer assembly comprising a printer for printing on a CD, the printer having a loading position for receiving CDs, the printer having a movable printhead, a printer frame having a guide for mounting the printhead, and a drive for driving the printhead along the guide, a CD handler slidably mounted on the printer frame for movement with the printhead along the guide and having a mechanism for carrying CDs, a blank CD station, and a coupling between the CD handler and the printhead so the CD handler moves with the printhead between the blank CD station and the printer loading position, and a CD recorder having a CD recorder loading position for receiving a CD, the CD handler being movable with the printhead along the guide to position a CD held in the CD handler to overlie the CD recorder loading position.

9. The assembly of claim 8, wherein the assembly includes a finished CD station on an opposite side of the printer loading position from the blank CD station, the CD handler being movable along the guide with the printhead to positions to overlie the blank CD station and the finished CD station.

10. The assembly of claim 8, wherein the CD handler comprises a carriage mounted on the CD handler and the mechanism for carrying CDs including an arm mounted on the carriage, the carriage being pivotally mounted about an upright axis relative to the CD handler, and engageable members to control the position of the arm about the upright axis at first and second positions of the CD handler as it moves with the printhead along the guide, such that when the engageable members engage adjacent the first position along the guide, the arm is pivoted in one direction of pivoting to overlie the blank CD station, and when the engageable members engage at the second position along the guide, the arm is pivoted in an opposite direction of pivoting to overlie a separate finished CD station.

* * * * *